United States Patent [19]

Crovella

[11] Patent Number: 5,438,522
[45] Date of Patent: * Aug. 1, 1995

[54] METHOD AND APPARATUS FOR SUB-SPAN INTERPOLATION

[75] Inventor: Robert M. Crovella, Maineville, Ohio

[73] Assignee: Cincinnati Milacron Inc., Cincinnati, Ohio

[*] Notice: The portion of the term of this patent subsequent to Jul. 20, 2010 has been disclaimed.

[21] Appl. No.: 233,479

[22] Filed: Apr. 26, 1994

Related U.S. Application Data

[63] Continuation of Ser. No. 992,954, Dec. 18, 1992.

[51] Int. Cl.$^6$ .................. G06F 15/46; G05B 19/42
[52] U.S. Cl. .................. 364/474.31; 318/571; 318/568.15; 318/573
[58] Field of Search .......... 364/474.31, 164, 474.28, 364/474.29, 474.3, 474.32; 318/568.15, 569, 570, 571, 573; 395/85, 87

[56] References Cited

U.S. PATENT DOCUMENTS

| | | | |
|---|---|---|---|
| 3,609,319 | 9/1971 | Clifford et al. | 235/151.11 |
| 3,720,814 | 3/1973 | Klein | 235/151.11 |
| 3,748,563 | 7/1973 | Pomella et al. | 318/537 |
| 3,857,025 | 12/1974 | English et al. | 235/151.11 |
| 3,860,805 | 1/1975 | Strukel | 235/152 |
| 3,969,615 | 7/1976 | Bowers et al. | 235/151.11 |
| 4,243,924 | 1/1981 | Onoda et al. | 318/573 |
| 4,262,336 | 4/1981 | Pritchard | 364/474 |
| 4,550,383 | 10/1985 | Sugimoto | 364/513 |
| 4,648,024 | 3/1987 | Kato et al. | 364/169 |
| 4,672,190 | 6/1987 | Rostkowski et al. | 250/202 |
| 4,683,543 | 7/1987 | Hirasawa et al. | 364/513 |
| 4,689,756 | 8/1987 | Koyama et al. | 364/513 |
| 4,794,540 | 12/1988 | Gutman et al. | 364/474.29 |
| 4,835,710 | 5/1989 | Schnelle et al. | 364/513 |
| 4,858,140 | 8/1989 | Buhler et al. | 364/474.31 |
| 4,879,663 | 11/1989 | Fuehrer | 364/513 |
| 4,903,213 | 2/1990 | Buhler et al. | 364/474.31 |
| 4,914,363 | 4/1990 | Stelzer et al. | 318/568.1 |
| 5,229,698 | 7/1993 | Minnich et al. | 318/568.15 |

FOREIGN PATENT DOCUMENTS

0470564 12/1992 European Pat. Off. ... G05B 19/415

*Primary Examiner*—Roy N. Envall, Jr.
*Assistant Examiner*—Cameron H. Tousi
*Attorney, Agent, or Firm*—John W. Gregg

[57] ABSTRACT

A method for efficiently interpolating sub-span position commands for control of a machine member. The method includes storing a set of coefficients defined by a parametric function relating member position and time, calculating the distance between a target coordinate axis position command and a current coordinate axis position command, generating first and second command modifiers from the stored coefficients, the calculated distance, and a current coordinate axis position command, and summing the current coordinate axis position command and the first and second command modifiers to generate a subspan position command.

7 Claims, 5 Drawing Sheets

METHOD AND APPARATUS FOR SUB-SPAN INTERPOLATION

This is a continuation Ser. No. 07/992,954 filed on Dec. 18, 1992.

BACKGROUND OF THE INVENTION

I. Field of the Invention

This invention relates generally to numerical control of machines. In particular, this invention relates to control of motion of machine members to effect relative motion of a workpoint along a predetermined path.

II. Description of the Prior Art

Figure 1:
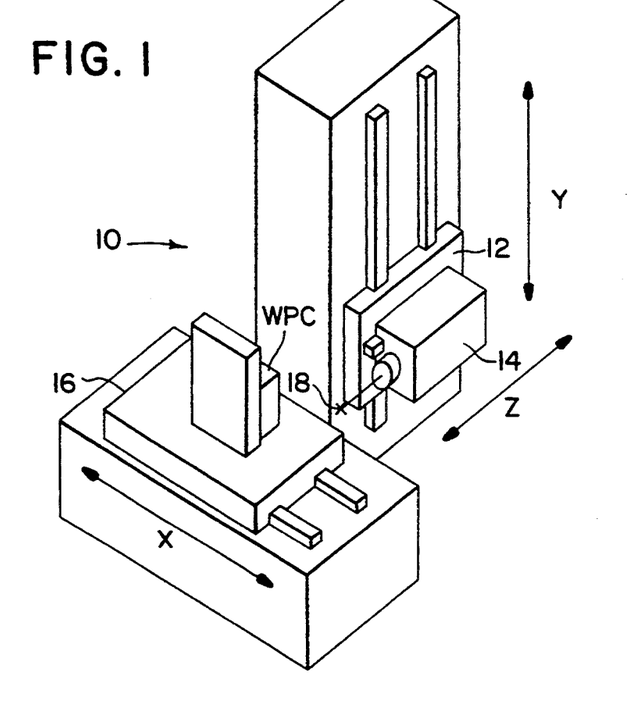
FIG. 1 illustrates a machine having moveable members to be controlled in the course of producing a finished workpiece.

Of particular interest herein is coordinated motion of plural members of a machine such as machine 10 shown in FIG. 1. Members 12, 14, and 16, each movable along a linear axis, such as the X, Y, and Z axes shown, may be controlled such that workpoint 18 is caused to move along a path in the course of performing work on workpiece WPC. Linear paths are typically defined by path end points represented by sets of coordinates of the orthogonal X, Y, and Z axes. Circular paths are defined by a combination of path end points and circle center data.

The machine is controlled by a cycle control which operates as a conventional programmable controller to execute control programs relating machine push buttons, lights, limit switches, tool changes and the like with the operational cycle of the machine. The cycle control transfers workpiece program instructions, which include blocks of instructions for defining member position coordinates, feed rates, spindle speeds and the like, to a block processor. The block processor decodes the workpiece instructions into data and distributes the data to other processors in the machine for control of the machine. Some of the decoded data is distributed to a path generation processor that generates coordinate axis position commands for each of the machine members oriented in the X, Y, and Z axis at predefined machine position update intervals. These coordinate axis position commands are transferred to a servomechanism controller which provide closed loop control of an actuator, such as a motor, for each of the machine members.

The closed loop control of the machine member actuators includes current signals provided to the machine member actuators. The current signals are generated by power switches in a power block which are operated by control signals from the servomechanism controller. The current signals to the machine member actuators cause the machine member controlled by the actuator to move in its respective axis to a position and at a rate corresponding to the control signals from the servomechanism controller. Transducers associated with each machine member provide signals indicative of the actual position of the machine member and these signals are used by the servomechanism controller as error signals to adjust the control signals to the power switches.

To generate the control signals to the power switches, the digital signal processor within the servomechanism controller uses a predetermined number of successive coordinate axis position commands to generate sub-span or intermediate position commands at an interval rate corresponding to a servomechanism loop closure rate. The servomechanism loop closure rate is less than the machine member position update rate so there are a predetermined number of sub-span position commands generated between coordinate axis position commands. The coordinate axis position commands and sub-span position commands are used to generate the control signals to the power switches.

The sub-span position commands are generated in two different manners. One manner of generating sub-span commands is to generate them linearly, that is, the sub-span position commands are interpolated according to a linear function joining successive coordinate axis position commands. However, linear function sub-span interpolation can result in path errors when the required movement between successive coordinate axis position commands is defined by a non-linear function. To reduce the path errors caused by sub-span position commands interpolated linearly, a non-linear function for interpolation of sub-span position commands was developed. This method of sub-span position command interpolation is described in the co-pending U.S. patent application, Ser. No. 07/563,366, filed Aug. 6, 1990, now U.S. Pat. No. 5,229,698 entitled "Method and Apparatus For Sub-Span Interpolation" and is hereby expressly incorporated by reference. Described in U.S. Pat. No. 5,229,698, the method for generating sub-span commands requires more processor resources, such as processor execution time and memory, than does the linear method of sub-span position command interpolation. To ease the requirements for processor time and memory resources necessary for the non-linear sub-span position command interpolation, a more processor resource efficient method of non-linear sub-span position command interpolation is needed.

SUMMARY OF THE INVENTION

It is an object of the present invention to more efficiently generate the sub-span position commands non-linearly interpolated from the coordinate axis position commands to conserve processor resources.

Further objects and advantages of the present invention shall become apparent from the accompanying drawings and the following description thereof.

In accordance with the aforesaid object of the present invention, the sub-span interpolation for control of a machine member movement is done in a manner that more effectively utilizes the CPU and memory resources of the processor associated with the servomechanism controller. The sub-span interpolation method includes storing a set of coefficients defined by a parametric function relating member position and time; calculating the difference between a target coordinate axis position command and a current coordinate axis position command; generating a first command modifier from one of the stored coefficients and the calculated difference; generating a second command modifier from a second one of the stored coefficients and a previously generated path command difference; and summing the current coordinate axis position command, the first command modifier, and the second command modifier to generate a sub-span position command that is output to move a machine member. By using successive coordinate axis position command differences to define variables used to generate the sub-span position commands for another span, a multiplication can be replaced with a more efficient subtraction operation.

DESCRIPTION OF THE PREFERRED EMBODIMENT

In order to illustrate the present invention, a computer numerical control (CNC) constituting a preferred embodiment shall be described in detail. This control corresponds to the Acramatic 950 control available from Cincinnati Milacron Inc., the assignee of the present invention. A servo mechanism control implementing the machine member motion control of the present invention is intended for use with such a CNC. While the preferred embodiment shall be described in considerable detail, it is not the intention of applicants to limit the scope of the invention to such detail. Rather it is intended that the scope of the invention be defined by the appended claims together with all equivalents thereto.

Figure 2:
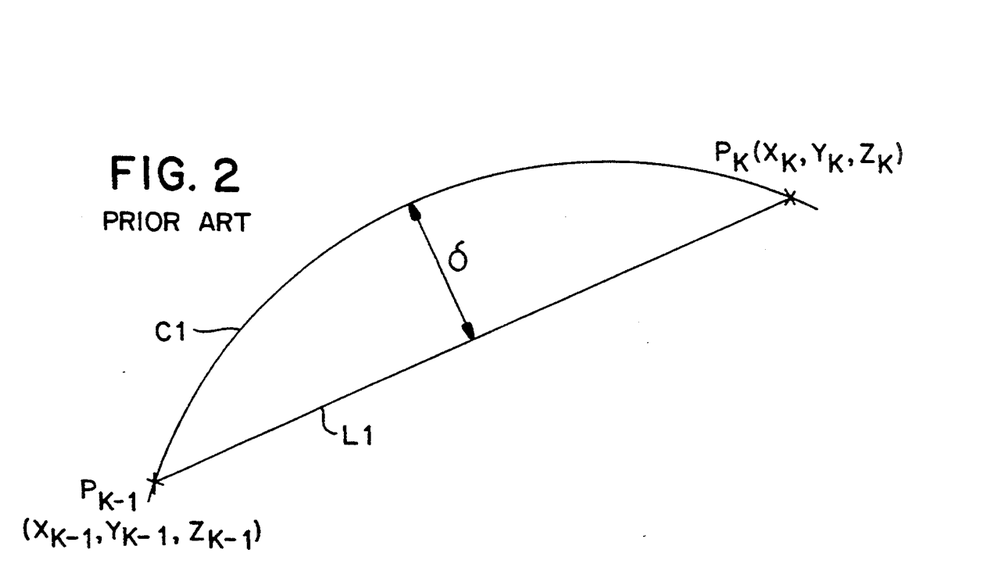
FIG. 2 illustrates the path error arising from the prior art control technique.

Previously known CNC techniques may result in a path error between the desired path of a machine member and the actual path commanded by the in-axis changes of position. For example, FIG. 2 illustrates an actual path of motion resulting from a known CNC technique to effect arcuate motion of a machine member in orthogonal linear machine axes. Between intermediate points $P_{k-1}$ and $P_k$ lying on a predetermined path C1 the workpoint 18, advanced through linear sub-increments, follows the chord L1 connecting the intermediate points. This results in deviation from the desired arcuate path C1. The path error is:

$= P_p - P_{chd}$

Where:
$P_p$ = coordinates of midpoint of curve C1
$P_{chd}$ = coordinates of midpoint of chord L1

The chords may have lengths of several sub-increments resulting in an unacceptably large path error when the desired arcuate path is of relatively small radius. While path error is conveniently illustrated with reference to orthogonal machine members effecting arcuate motion, it will be appreciated that other machine constructions, for example industrial robots including pivoting links, will, when effecting motion of a workpoint on linear paths, likewise produce path errors when the in-axis changes of position are linearly subdivided in time between intermediate path points. In general, path errors which are of interest herein arise from the use of linear sub-span interpolation to control changes of position which are nonlinear with respect to time.

A conventional path point generator produces intermediate path points $P_1$ such as the successive intermediate path points $P_k$ and $P_{k-1}$ (FIG. 2). Because the path generator producing the intermediate path points defined by intermediate path point coordinates controls path related functions such as acceleration, deceleration, and any other commanded changes in the path, it is not practical to simply increase the repetition rate at which intermediate path point coordinates are produced to eliminate or reduce the path error described with reference to FIG. 2.

It will be recognized by those skilled in the art that any path of motion in orthogonal space may be described alternatively as parametric functions of time in each axis. Therefore, successive positions of, for example, the X axis member may be described in terms of a time based polynomial curve connecting a predetermined number Q of axis positions X lying on the path (path points). The polynomial curve may be subdivided in time to produce position data intermediate of the path points. As each successive path point is generated, the polynomial representation of the curve may be reevaluated using the values of the last Q axis positions to produce new position data for intermediate points lying between the last two successive path points.

Figure 3:
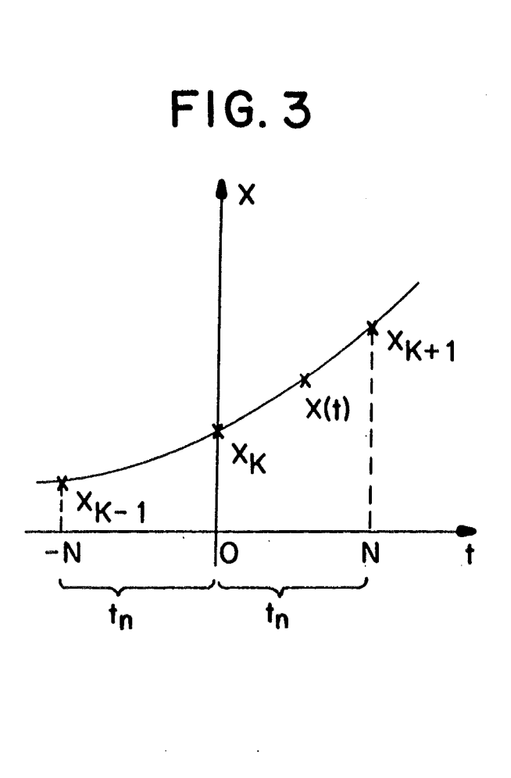
FIG. 3 illustrates the machine member motion control effected by the present invention.

Applicants have chosen to use a time based parabolic function as shown in FIG. 3 for the production of position data intermediate the path points. The parabolic curve is subdivided into an arbitrarily chosen number N of equal subintervals of time $t_n$, where N is two (2) or more. The parabolic curve is defined by three successive path points separated by equal time intervals defined by, for example, a position update interval of a machine control. Since the three positions are equally spaced in time, the previous position $X_{k-1}$ is conveniently assigned to time $-N$, the present position $X_k$ is assigned to time 0, and the target position $X_{k+1}$ is assigned to time N. The parabolic curve relates position and time according to:

$$X(t) = At^2 + Bt + C \qquad (1)$$

Where the coefficients A, B, C satisfy the known conditions:
$X(0) = X_k$
$X(-N) = X_{k-1}$
$X(N) = X_{k+1}$ From equation (1) and the known conditions, the coefficients are determined to be:

$$A = (X_{k-1} - 2^*X_k + X_{k+1})/2^*N^2 \qquad (2)$$

$$B = (X_{k+1} - X_{k-1})/2^*N \qquad (3)$$

$$C = X_k \qquad (4)$$

By substituting the values for A, B, and C from equations (2), (3), and (4) into equation (1), and grouping terms, the expression for X(t) becomes:

$$X(t) = [(t^2 - Nt)/2^*N^2]^*X_{k-1} + [1 - ((2^*t^2)/2^*N^2)]^*X_k + \qquad (6)$$
$$[(t^2 + Nt)/2^*N^2]^*X_{k+1}$$

The same expression is applicable to the other orthogonal axes Y and Z by substitution of the previous, present and target positions of each axis into equation (6) to obtain values for Y(t) and Z(t). The previous, present and target positions are known with each repetitive production of intermediate path point coordinates by a conventional path generator as previously described. The coefficients of these quantities appearing in equation (6) may be calculated at the rate of occurrence of sub-intervals of $t_n$. However, since the coefficients are constant for any value of N, applicants have chosen to store the values for these coefficients for each $t_n$ period in look-up tables for recall as time advances from each successive period of $t_n$. The calculation of each X(t) is thereby greatly simplified and processing time is minimized.

As previously stated, applicants have implemented the control technique illustrated by FIG. 3 in a servomechanism control intended for use with a computer numerical control (CNC). The CNC generates path point data at a predetermined update interval in response to input data supplied in, for example, a numerical control program. The CNC, illustrated by the block diagram of FIG. 4, includes: an operator or user interface; machine mechanism interface and control; program storage and edit facilities; machine cycle control; workpiece program interpretation; and, path generation control.

Figure 4:
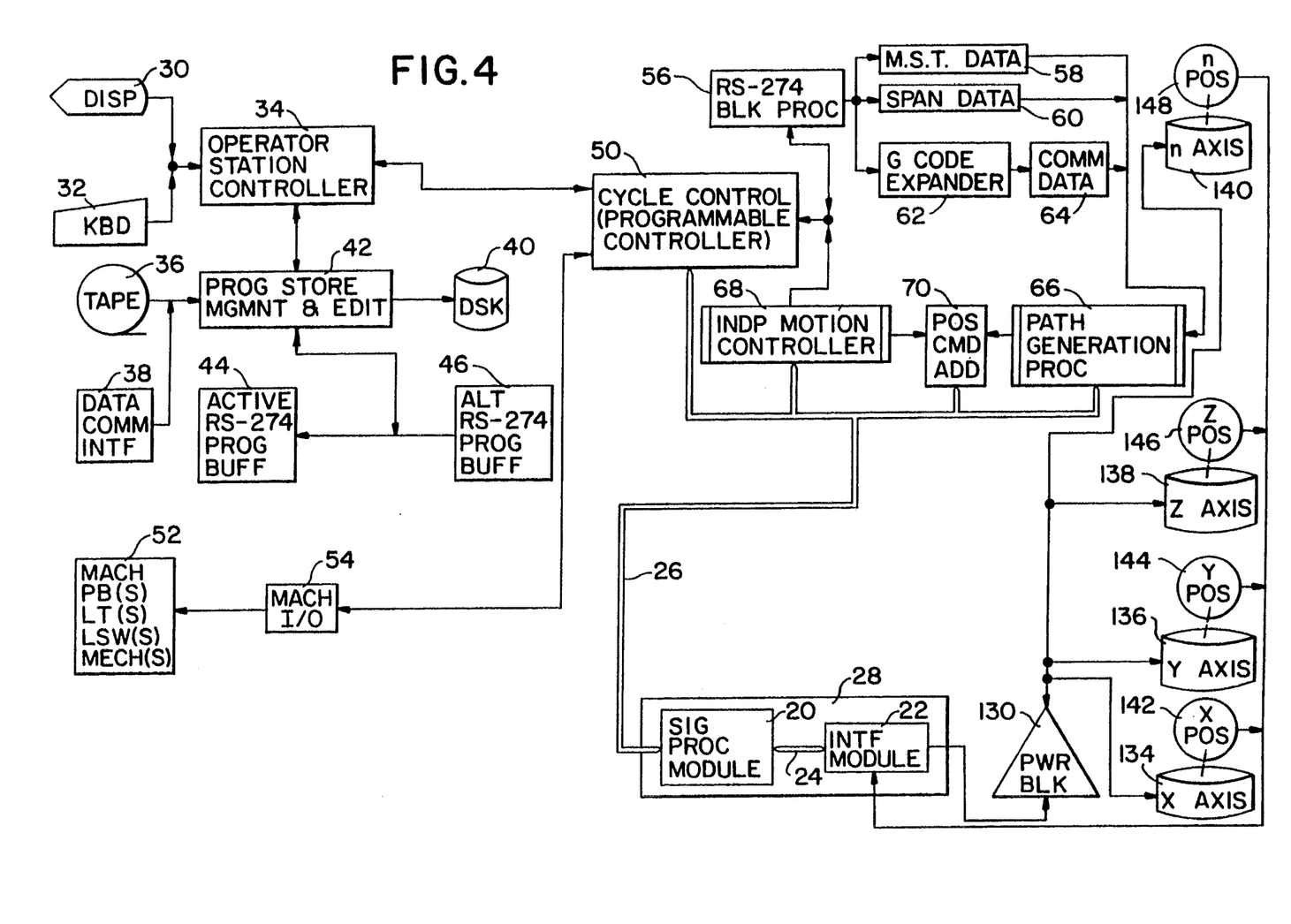
FIG. 4 is a block diagram of a machine control for effecting motion control in accordance with the present invention.

The operator interface includes a display device 30 such as a CRT or other alphanumeric display device, a manual data entry device such as keyboard 32 and an operator station controller 34. The operator station controller receives data to be displayed from the numerical control system processors and formats the data for the display device 30. Manual data entries from the keyboard 32 are encoded by operator station controller 34 for distribution to other numerical control system elements. Operator station controller 34 enables manual data input in accordance with the active mode of operation of the machine as determined by the machine cycle control.

In addition to manual data input, workpiece programs may be entered into local storage of the control by means of bulk data transfer devices such as, for example a tape reader 36 or a data communication interface 38. Bulk storage of workpiece programs is provided on disk store 40. A program storage and edit controller 42 manages the communication of data from the input devices 36 and 38 to and from the bulk store 40 as well as to and from the operator station controller 34. Two workpiece program buffers 44 and 46 are provided for active and alternative workpiece programs. Program instructions are transferred for execution from the active buffer 44. The alternative buffer 46 provides storage for a program which may be edited while execution of a program goes forward.

The overall cycle of operation of the CNC is controlled by the cycle control 50. Cycle control 50 operates as a conventional programmable controller to execute control programs relating machine push buttons, lights, limit switches and mechanisms such as transmissions, tool changers, workpiece transfer devices and so forth with the cycle of operation of the controlled machine. The machine elements are indicated generally by block 52 and are monitored and controlled through a machine input-output interface 54. In control of the cycle of operation of the machine, cycle control 50 effects transfer of workpiece program instructions from the active buffer 44 to a block processor 56. Further, cycle control 50 monitors the machine status and effects the appropriate response to error conditions.

Workpiece programs consist of blocks of instructions containing data defining position axis coordinates, feed rates, tool selections, spindle speeds, miscellaneous functions and cycle control codes. These programs are created to conform to a known programming convention, such as EIA RS 274. The block processor 56 decodes each block of instructions and distributes the data as appropriate for control of machine functioning. Miscellaneous function, spindle speed and tool data associated with machine functions such as tool selection, transmission speed changes and mechanism control are placed in the data store 58. Coordinate data specifying end points for the machine member axes of motion are placed in the data store 60. Code expander 62 operates on cycle control codes to effect selection of commissioning data from the commissioning data store 64 and to select the desired mode of path generation.

Path generation processor 66 produces coordinate axis position commands for each machine position update interval in accordance with the machine operations specified by the active workpiece program instructions. The position commands $X_k$, $Y_k$, and $Z_k$ produced by path generation processor 66 reflect the rate of change of position of all machine axes as defined by the programmed coordinates, feed rates, and cycle commands. Cycle control codes for path generation selection may be used to control the method of sub-span interpolation effected by servomechanism control 28.

In addition to path generation processor 66, coordinate axis position commands may be generated by an auxiliary span generator 68. Auxiliary span generator 68 produces axis motion commands in accordance with machine activity as specified by the machine builder such as, for example, motions to predetermined locations to effect tool or workhead changes or in response to operator input. While it is not customary for such motions to be executed simultaneously with motions commanded by a workpiece program, the auxiliary motion commands are summed with motion commands produced in response to the workpiece program coordinates at position command summer 70 resulting in net motion commands. The result of this summation is then output to the servomechanism control 28.

Servomechanism control 28 effects closed loop control of the machine member actuators such as motors 134 through 140. Control of motor current is performed via power switches at power block 130 in response to control signals generated by servomechanism control 28. Actual position of the actuators is measured by position transducers 142 through 148 mechanically driven directly or indirectly by, respectively, motors 134, 136, 138, and 140. Servomechanism control 28 includes a signal processing module 20 and an interface module 22. The interface module 22 does not form a part of the present invention and no further details thereof shall be given herein.

The signal processing module 20 of servomechanism control 28 performs sub-span interpolation to produce intermediate path point coordinates or sub-span position commands intermediate the path points generated by the CNC in accordance with the technique illustrated by FIG. 3. In addition, signal processing module 20 calculates position loop following errors, i.e., the difference between commanded position and actual position for each position loop closure interval, calculates velocity commands in response to the following errors, and produces current commands to control motor velocities. Current command signals for each motor being controlled are periodically loaded to registers in interface module 22 which provides control signals for the power switches of power block 130.

Data is exchanged between the CNC and the digital signal processing module 20 over a system data bus 26. In applicants' preferred embodiment, communication between the servomechanism control 28 and the CNC is accomplished over a data bus conforming to the signal specification of IEEE Standard 796–88 for the P1 connector. Data entered under control of the operation station controller 34 or from the workpiece program as well as data from commissioning data store 64 are all available over data bus 26 to the servomechanism controller 28. Data is exchanged between the digital signal processing module 20 and the interface module 22 via a dedicated servo control bus 24 providing independent data and address lines.

Signal processing module 20 shall be described with reference to FIG. 5. Signal processing module 20 uses digital signal processors 80 and 86 to perform the calculations to generate the sub-span position commands and current command signals for controlling machine member actuators such as motors 134 through 140. Applicants have chosen the TMS 320C25 digital signal processors available from Texas Instruments Inc. Programs executed by signal processor 80 are stored in local read only memory 84 and include: actual position calculation routines 200; position loop control routines 202; velocity loop control routines 204; and, hardware monitoring routines 208. Signal processor 86 operates in conjunction with programs stored in memory 90 including: mode and enable command processing routines 212; sub-span interpolation routines 216; initialization routines 220; and, state transition control routines 224.

The signal processors 80 and 86 include built-in address and data busses which are independently connected to the system busses as will be further described herein. The bus 26 provides separate signal lines for address data exchanged through the system bus address driver 72. System bus data is exchanged through data transceiver 74. System bus 26 provides additional signal lines for interrupt signals which are connected at the interrupt interface 76. Local memory to support the exchange of data over the bus is provided in a random access memory 78. Data associated with servo system bus 24 is exchanged through the data transceiver 92 and servo system bus addresses are exchanged through the address driver 94.

Figure 5:
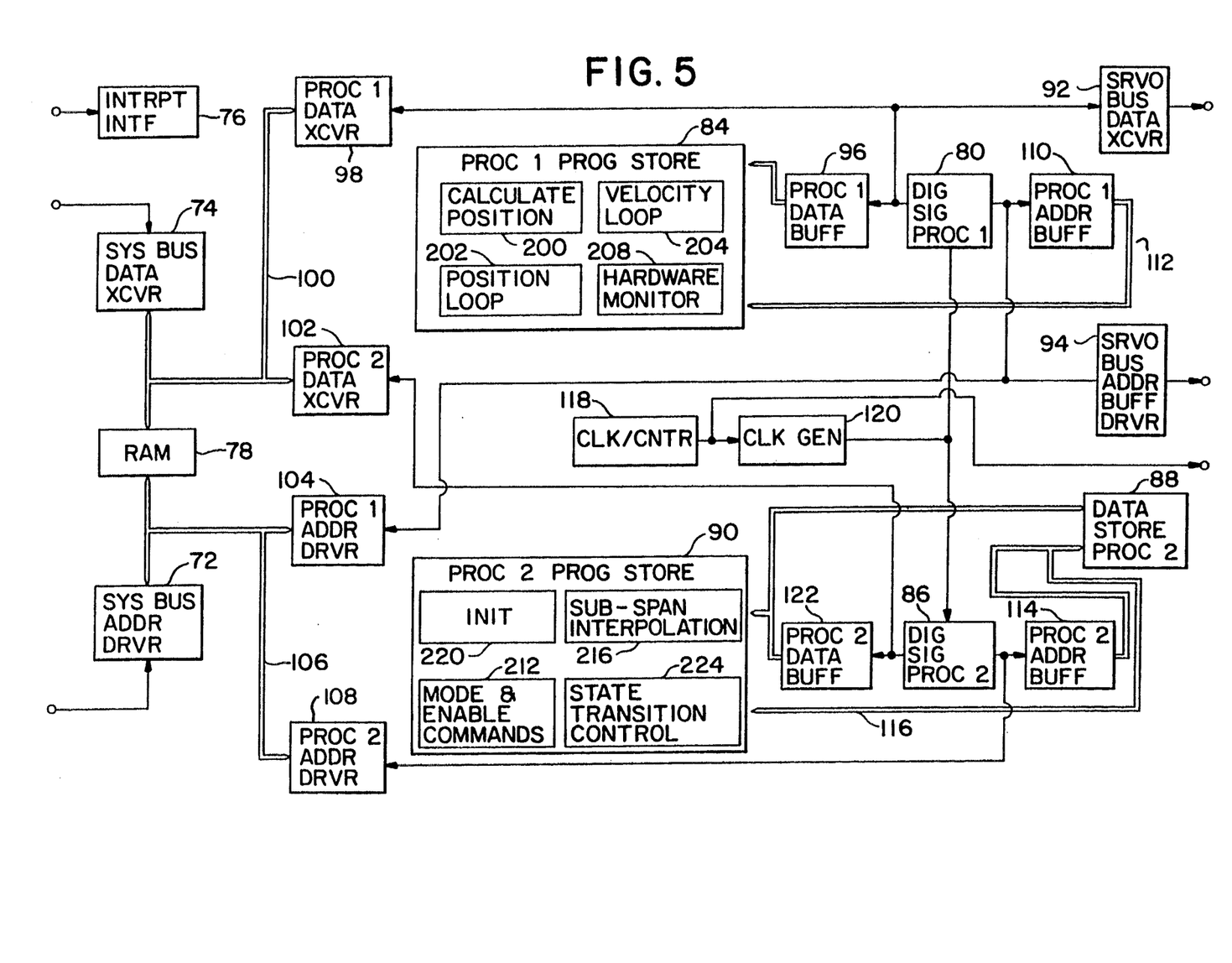
FIG. 5 is a block diagram of the signal processing module of the motor control shown in FIG. 4.

Continuing with reference to FIG. 5 and considering signal processor 80, address buffer 110 is interposed between the address bus of signal processor 80 and the immediate address bus 112 serving program store 84. In a like manner, address driver 104 is interposed between the address bus of signal processor 80 and a local address bus 106 serving system bus address driver 72 and memory 78. A data bus buffer 96 is interposed between the data bus of signal processor 80 and program store 84. Data transceiver 98 is interposed between the signal processor 80 data bus and a local data bus 100 serving system bus data transceiver 74 and memory 78. The address and data busses of processor 80 are connected to, respectively, servo system address buffer 94 and servo system data transceiver 92. Functions performed by signal processor 80 are primarily directed to position and velocity loop control associated with generation of current command signals, hence the direct connection to the servo system bus through transceiver 92 and buffer 94. Since these functions do not form a part of the present invention, further details thereof shall not be given herein.

Considering processor 86, address driver 108 is interposed between the address bus of signal processor 86 and the local address bus 106 serving the system address driver 72 and memory 78. Address buffer 114 is interposed between the address bus of signal processor 86 and the immediate address bus 116 to connect data store 88 which provides storage for variable data to processor 86 and program store 90. Data buffer 122 is interposed between the data bus of signal processor 86 and the data channels of data store 88 and program store 90. Data transceiver 102 is interposed between the data bus of signal processor 86 and the local data bus 100 serving system data bus transceiver 74 and memory 78.

Continuing with reference to FIG. 5, an oscillator and counter 118 produce outputs which are decoded as clock signals by the clock generator 120. These clock signals control the rate of execution of programs by the processors 80 and 86 and define predetermined time intervals assumed in the calculation of current command signals and the sub-intervals of sub-span interpolation.

Functions performed by signal processor 86 include sub-span interpolation. The operation of processor 86 shall be described with reference to the flow charts of FIGS. 6a, 6b, 7a, and 7b. Processing performed by signal processor 86 shall be described as background processing which is performed continuously until the occurrence of an interrupt signal at which time the interrupt procedure processing begins. The interrupt procedure processing of interest herein occurs in response to an interrupt generated by the clock generator 120 associated with the servomechanism loop closure interval.

Figure 6A:
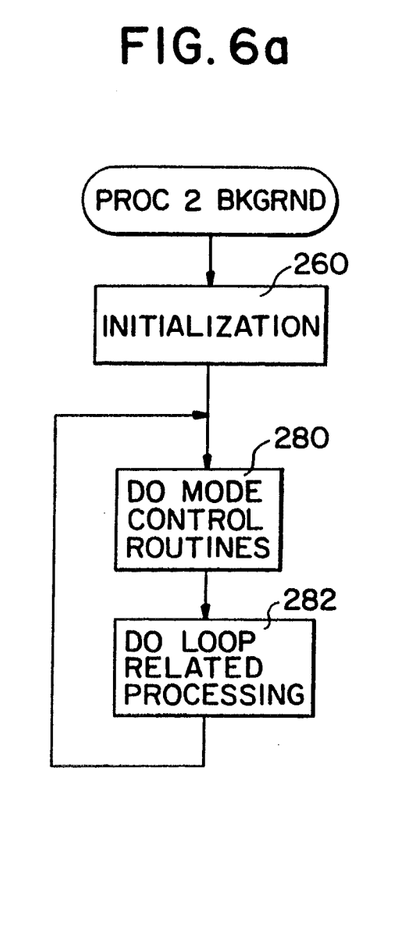
FIGS. 6a and 6b are flow charts of routines executed by the signal processing module of FIG. 5 to effect motion control as illustrated in FIG. 3.

A flow chart of the procedure for background processing performed by processor 86 is illustrated in FIG. 6a. At process step 260 initialization routines are executed when the state of the servomechanism controller as determined by the state transition control routines 224 (FIG. 5) demands initialization of data in preparation for servo operation. The initialization routines include calculation of values used in conjunction with the execution of parabolic sub-span interpolation procedures. Upon completion of the initialization routines, the background program processing continues with execution of an endless loop including the execution of state transition control routines 224 at process step 280. The state transition control routines 224 effect control over the transition of the servomechanism control 28 between predefined control states by providing for verification of all conditions required to proceed from control state to control state. These routines control the application and removal of power to the controlled actuators in accordance with commands produced by the CNC and the instantaneous conditions of the servomechanism controller. Other background processing functions are associated with servomechanism loop control and are indicated generally by process step 282. Details of these routines do not form a part of the present invention and shall not be described herein. Processing of the endless loop including process steps 280 and 282 continues until the occurrence of an interrupt.

Interrupt procedure processing shall be described with reference to FIG. 6b. Process step 300 loads the coordinate axis position commands produced by the CNC to local memory from memory 78. These coordinate axis position commands are used by the sub-span interpolation procedures to produce sub-span position commands for movement of the machine members. At process step 308 mode command data and axis enable status data from the CNC are loaded to local memory. These data include the servo type, i.e., velocity or position, flags indicating which of the controlled motors are enabled, and the cycle control data used to select the type of sub-span interpolation to be effected.

Interrupt procedure processing continues with execution of the sub-span interpolation routines 216 at process step 310. Sub-span interpolation generates the sub-span position commands subdividing the magnitude of position change commanded by the numerical control at the update interval. The sub-span position commands are output as position commands POS $CMD_I$ at the loop closure intervals. For sub-span interpolation along a straight line, the sub-span position commands are produced in accordance with the following equation:

$$\text{PoS CMD}_I = X_k + S*(\delta t/UT)*I \tag{7}$$

Where:

X designates the coordinate axis position commands produced by the CNC and the subscripts k and k+1 designate, respectively, the present and target coordinate axis position commands;

S is the change of position at update interval and is equal to $X_{k+1} - X_k$;

δt = sub-span interval;

I = index identifying the sub-interval for which position commands are being produced;

UT = update interval.

The sub-span position commands produced in accordance with the parabolic sub-span interpolation technique described herein are generated according to the following equation:

$$\text{POS CMD}_I = X_{k-1}*M1_r + X_k*M2_I + X_{k+1}*M3_r \tag{8}$$

Where:

X designates the coordinate axis position commands produced by the CNC and the subscripts k, k−1, and k+1 designate, respectively, the present, previous and target coordinate axis position commands;

$M1_I$ = coefficient of the previous coordinate axis position command for the Ith interval;

$M2_I$ = coefficient of the present coordinate axis position command for the Ith interval;

$M3_r$ = coefficient of the target coordinate axis position command for the Ith interval;

I = index identifying the sub-interval for which sub-span position commands are being calculated.

The newly created sub-span position commands POS $CMD_I$ are stored in memory 78 for access by processor 80. Following completion of the execution of the sub-span interpolation routines, execution of the background programs is continued by return through terminal 330.

Figure 7A:
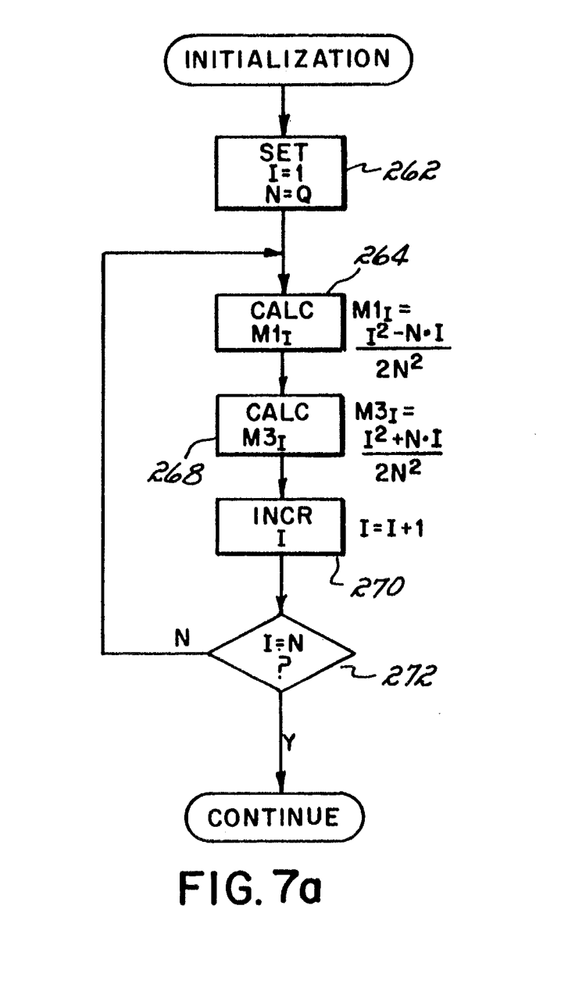
FIGS. 7a and 7b are flow charts of procedures executed in association with the sub-span interpolation processing of FIGS. 6a and 6b.

The procedures executed by processor 86 to produce the sub-span position commands shall be described with reference to FIGS. 7a and 7b. A procedure for calculating values of coefficients used in equation (6) is illustrated by the flow chart of FIG. 7a. As previously stated, applicants have chosen to calculate and store the values of these coefficients for recall during execution of sub-span interpolation. The procedure of the flow chart of FIG. 7a is performed as part of the initialization procedure of process step 260 of the flow chart of FIG. 6a performed before execution of the background programs. For the preferred method of generating the position commands for the sub-span interpolation, only two coefficients $M_1$ and $M_3$, need to be calculated.

While the calculation of the coefficients for the sub-span interpolation have been provided in U.S. Pat. No. 5,229,698, a more efficient method for calculating the coefficients and sub-span position commands has been developed in accordance with the principles of the present invention. The equation for calculation of successive coordinate axis position commands of U.S. Pat. No. 5,229,698 is:

$$\text{POS CMD}_I = X_{k-1}*M1_r + X_k*M2_I + X_{k+1}*M3_I \tag{8}$$

From equation (6) the coefficients $M1_I$, $M2_I$, and $M3_I$ are:

$$M1_I = (I^2 - I*N)/(2*N^2); \quad M2_I = 1 - ((2*I^2)/2N^2);$$
$$M3_I = (I^2 + I*N)/2*N^2$$

Two variables are defined:
$S = X_{k+1} - X_k$; and $S_p = X_k - X_{k-1}$, where S is a coordinate distance between the target path point coordinate axis position $X_{k+1}$ and the present path point coordinate axis position $X_k$, and $S_p$ is the coordinate distance between the present path point coordinate axis position, $X_k$ and the next previous or preceding path point coordinate axis position $X_{k-1}$. By substituting these variables into the POS $CMD_I$ formula (8):

$$\text{POS CMD}_I = (X_k - S_p)*M1_r + X_k*M2_r + (X_k + S)*M3_r;$$

and rearranging the terms, the following expression is obtained:

$$\text{POS CDM}_I = X_k*(M1_I + M2_I + M3_I) + S*M3_I - S_p*M1_I. \tag{9}$$

The sum of coefficients, $M1_I + M2_I + M3_I$, equals 1. Substituting this sun into the POS $CMD_I$ formula (9) yields:

$$\text{POS CMD}_I = X_k + S*M3_I - S_p*M1_r \tag{10}$$

The elimination of a multiplication is readily apparent comparing the equation (10) to equation (8). Specifically, the multiplication with the $M2_I$ coefficient has been eliminated. The elimination of this multiplication operation appears to be replaced by the two subtraction operations necessary to calculate S and $S_p$. However, because $S_p$ is merely the S previously calculated for the generation of the prior sub-span position commands, only one subtraction operation, i.e., the one to calculate S, is needed. The substitution of a subtraction for a multiplication in digital computations results in a more efficient utilization of computer resources.

Referring to FIG. 7a at process step 262 an index I is set equal to one and a sub-increment count N is set equal to a predetermined number Q of sub-increments supplied, for example, from commissioning data store 64 of the CNC. Preferably, Q is in the inclusive range of 4 to 60 although other values may be used. At process step 264 the coefficients $M1_I$ of the previous coordinate axis position command is calculated and stored at a location identified by the index I. At process step 268 the coefficients $M3_I$ of the target path point is calculated and stored at a location identified by the index I. At process step 270 the index I is incremented by one. At decision step 272 the index is compared to the sub-increment count N and if they are equal, execution of the initialization procedures is continued through terminal 274. If the value of index I is found to be less than the sub-increment count N at decision step 272, execution proceeds to process step 264. Values for the coefficients $M1_I$ and $M3_I$ are calculated and stored in this manner for integer values of I from one to N.

Figure 6B:
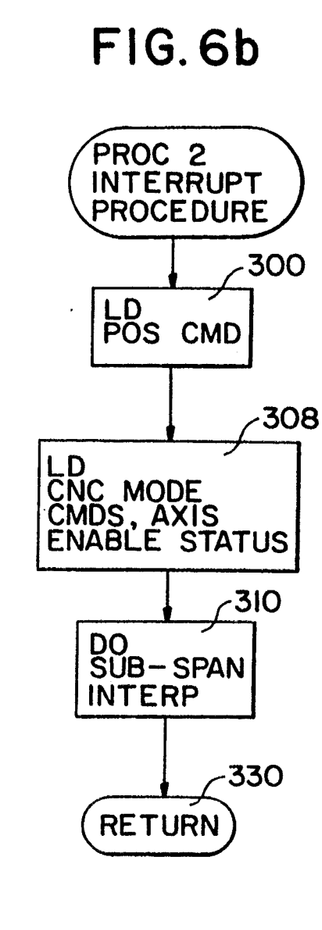
Figure 7B:
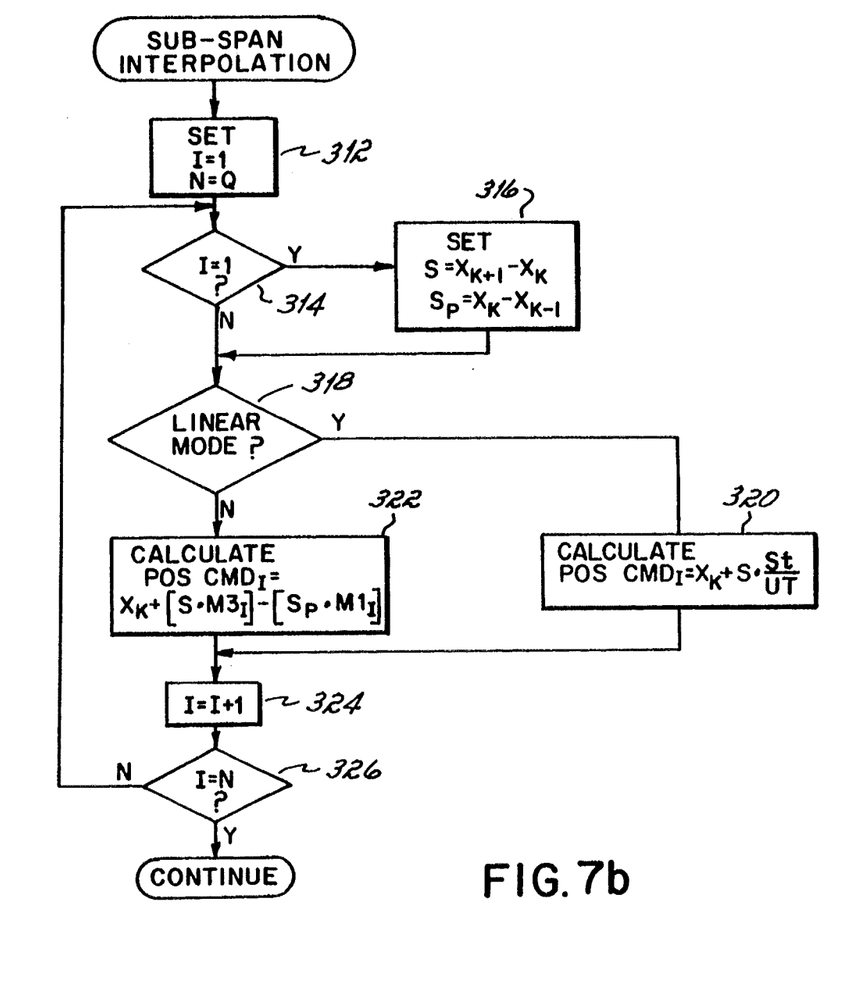

With the values of the coefficients $M1_I$ and $M3_I$ stored, execution of sub-span interpolation calculations may proceed in accordance with the procedure illustrated by the flow chart of FIG. 7b. This procedure is performed by processor 86 in connection with process step 310 of FIG. 6b. At process step 312 a sub-increment index I is set equal to one and a sub-increment count N is set equal to the predetermined number Q of sub-increments. At decision step 314, the sub-increment index I is tested to determine whether this is the first sub-increment I in the sub-span. If it is, S is set equal to the target path point coordinate axis position command, $X_{k+1}$, minus the current path point coordinate axis position command, $X_k$, and $S_p$ is set equal to the S calculated for the preceding update when the present path point was the target path point. At processing step 316, S is calculated by a subtraction operation and $S_p$ is simply set to the previous S. This time shifting of the difference of the coordinate axis position command differences used in the sub-span interpolations for each coordinate axis position command eliminates the subtraction implied by $S_p$ of equation (10).

At decision step 318 the CNC interpolation mode command flag is tested to determine whether linear or parabolic sub-span interpolation is to be performed. If linear sub-span interpolation is to be performed, calculation of the sub-span position command POS $CMD_I$ which is for the Ith sub-interval within the current span occurs at process step 320 in accordance with the algorithm previously described for linear interpolation. If parabolic sub-span interpolation is to be performed, calculation of sub-span position command POS $CMD_I$ which is for the Ith sub-interval within the current span occurs at process step 322 by addition of the present sub-span position command with a first and second command modifier. The command modifiers are the products of the coefficients $M1_I$ and $M3_I$, with $S_p$ and S, respectively. Following calculation of the sub-span position commands, the index I is incremented by one at process step 324.

At decision step 326, the index I is compared to the sub-increment count N and if equal, processing of the procedures of the flow chart of FIG. 6b continues through terminal 324. If the index I is less than the sub-increment count N, execution continues at process step 314 and the next sub-span position command POS $CMD_I$ is calculated. This loop is reiterated until N sub-span position commands are generated. Preferably, each of the coefficients $M3_I$ and $M1_I$ are sixteen bit digital values and the coordinate axis position commands are thirty-two bit values. Thus, the method disclosed in the parent application requires a multiplication of a sixteen bit and thirty-two bit quantity. Because the variables S and $S_p$ are coordinate axis position command difference values, they may be accurately represented by a sixteen bit quantity. Correspondingly, the multiplications for each $M1_I$ times $S_p$ and $M3_I$ times S generate a sixteen bit product. Thus, the operations to form the command modifiers are more computationally efficient.

As previously noted, the sub-span interpolation technique of the present invention is equally well suited to machines having pivoting movable members such as industrial robots. In general, the present invention is applicable to any control of motion of a machine member to effect motion along a path wherein the changes of position of the member with respect to time may be defined by a polynomial continuous through the successive path points defining the polynomial.

While the present invention has been illustrated by the description of the preferred and alternative embodiments and while the embodiments have been described in considerable detail, it is not the intention of the applicants to restrict or any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed is:

1. A method for controlling motion of a machine member to effect motion of a workpoint along a predetermined path wherein coordinate axis position commands defining path points are periodically produced at a predetermined time interval, the method comprising the steps of:

selecting a number of sub-intervals for calculating sub-span position command;

producing a set of values of coefficients of coordinate axis position commands in an expression of machine member position, the coefficients being defined for each selected sub-interval, the expression being derived from a predetermined parametric function relating machine member position and time defined by three successive coordinate axis position commands;

generating a first coordinate distance as the difference between a current coordinate axis position command and a next coordinate axis positon command;

generating a second coordinate distance as the difference between the current coordinate axis position command and a prior coordinate axis position command;

generating a first command modifier for each selected sub-interval from a first coefficient from the set of values of coefficients and the first coordinate distance;

generating a second command modifier for each selected sub-interval from a second coefficient from the set of values of coefficients and the second coordinate distance summing the present coordinate axis position command and the first and second command modifiers to produce a sub-span position command for each selected sub-interval; and moving the machine member in response to the sub-span postion commands at a rate defined by the sub-interval.

2. The method of claim 1 wherein the parametric function is a parabola joining three successive path points and the second coordinate distance is a time-shifted first coordinate distance.

3. The method of claim 1 wherein the coefficient values are stored in sets, each set including coefficients for a single sub-interval and the step of producing values of coefficients further comprises recalling a stored set of values for each selected sub-interval.

4. A device for controlling motion of a machine member comprising:

means for periodically producing coordinate axis position commands for moving the machine member to path points at a first predetermined time interval;

means for selecting a number of sub-intervals;

means for producing a set of values of coefficients for each selected sub-interval;

means for generating a first coordinate distance from a present coordinate axis position command and a target coordinate axis position command for the first predetermined time interval;

means for generating a second coordinate distance having a predetermined relationship between the present coordinate axis position command and a prior coordinate axis position command for the predetermined time interval;

means for periodically calculating sub-span position commands for moving the machine member intermediate the path points at a predetermined sub-interval less than the predetermined time interval, the sub-span position commands being the sum of calculating a product of one of the coefficient values and the first coordinate distance for each sub-interval and a product of another of the coefficient values and the second coordinate distance for each sub-interval; and means for moving the machine member in response to the sub-span position commands at a rate defined by the sub-interval.

5. The device of claim 4 wherein said means for generating the second coordinate distance generates the second coordinate distance for a present coordinate axis position command with the first coordinate distance generated for a previous coordinate position command.

6. The device of claim 4 further comprising means for storing sets of values of coefficients, each set including coefficients for a single sub-interval.

7. The device of claim 6 wherein the means for producing a set of values of coefficients recalls a set of coefficient values for each selected sub-interval.

* * * * *